Sept. 17, 1929.  G. F. ECKART  1,728,401
FLEXIBLE GEAR DRIVE
Filed April 16, 1928
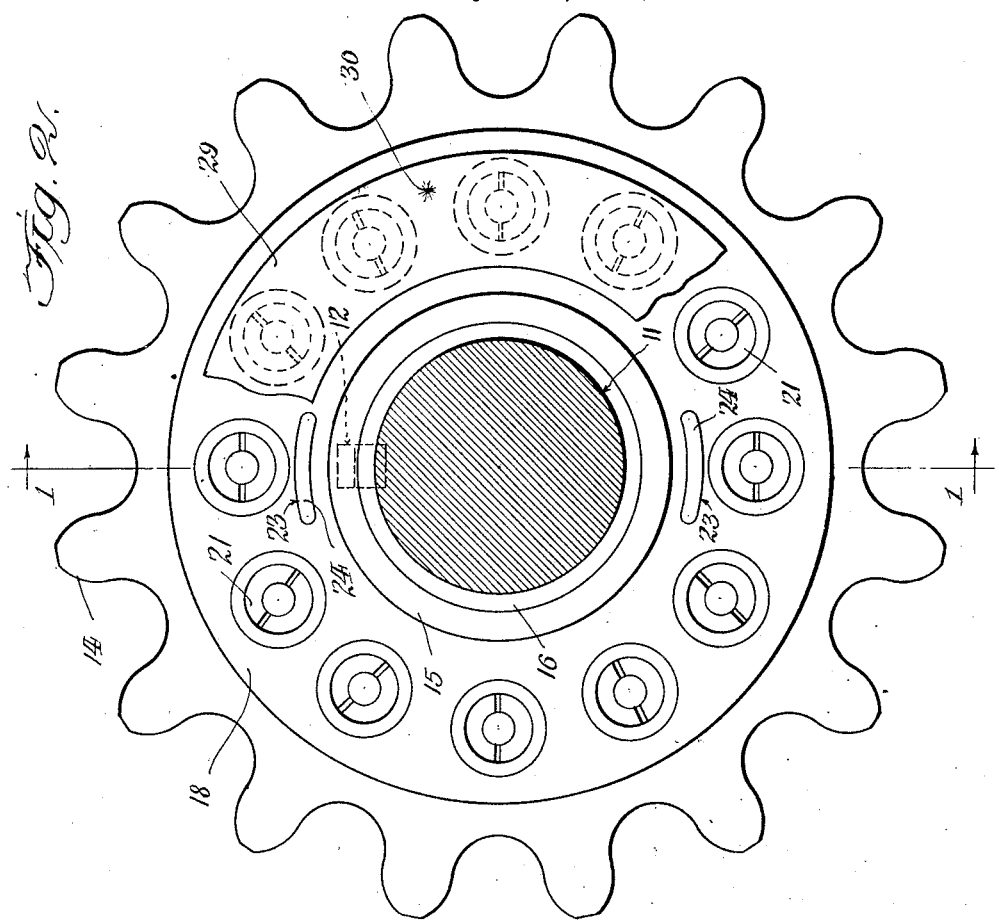
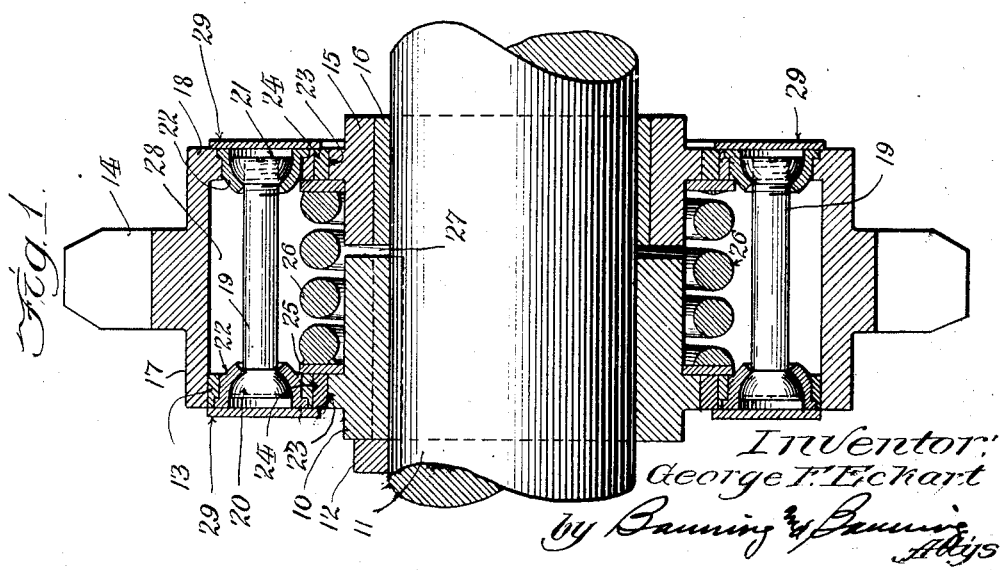
Inventor:
George F. Eckart
by Banning & Banning
Attys Patented Sept. 17, 1929

1,728,401

UNITED STATES PATENT OFFICE

GEORGE F. ECKART, OF CHICAGO, ILLINOIS, ASSIGNOR TO GEORGE A. CHRITTON, TRUSTEE, OF CHICAGO, ILLINOIS

FLEXIBLE GEAR DRIVE

Application filed April 16, 1928. Serial No. 270,172.

This invention relates to flexible gear drives and the like.

An object of the invention is to provide a flexible drive for gears, sprockets, and the like which is yieldable to a certain extent so as to absorb sudden shocks delivered to these gears which might otherwise damage the gears or damage the machinery driven by the gears. This is particularly true of long trains of gears and especially of certain mechanisms which are driven by the gears where it is highly desirable that the parts driven thereby shall run as smoothly as possible and without any sudden starts or jerks.

Another object is the provision of a yieldable gear of this type which is strong and durable and at the same time as simple in construction as possible.

These and other objects, as will hereafter appear, are accomplished by this invention which is fully described in the following specifications, as shown in the accompanying drawing in which—

Figure 1 is a longitudinal section on the line 1—1 of Fig. 2 showing a gear embodying the invention, and;

Fig. 2 is a front elevation of the same showing the angular end plate partly removed.

The embodiment illustrated comprises a hub 10 adapted to be secured to a shaft 11 by means of a suitable key 12, said hub having a circular radial flange 13 extended therefrom.

A sprocket-wheel, spur gear, or the like, 14 is carried upon a second hub member 15 which is preferably provided with a bronze bushing 16 which is adapted to be journaled on the shaft 11 for oscillatory movement. The gear member 14 is also provided with a ledge 17 which overlies the flange 13 and has a bearing thereon.

The flange portion 18 of the gear member 14 and the flange 13 oppose each other, the two being secured together by means of a series of radius rods 19 which are provided with enlarged semi-spherical ends 20 and 21. These enlarged ends fit into semi-spherical cups 22 which are suitably fitted into countersunk openings in the flanges 18 and 13.

These flanges are also provided with suitable openings 23 in which are fitted similarly shaped arcuate keys 24. These keys in turn are welded or otherwise firmly secured to annular rings 25 and these in turn are welded or otherwise secured to the ends of a helical spring 26. This spring is quite heavy as it takes the entire load which is transmitted through the gear. The spring 26, in addition to carrying the load which is transmitted through the gear, also is under some compression so as to tend to force the flanges 13 and 18 out against the balls 20 and 21 of the radius rods.

The hubs 10 and 15 are separated by a small space 27. As the load causes the flange 18 to be moved with respect to flange 13 above the axis of the shaft 11, the radius rods 19 will tend to swing these flanges toward each other with the result that eventually the hubs 10 and 15 will meet and any further load will then be taken by the gears substantially as though they were solid. As soon as the load eases up a little, the spring 26 will again cause the parts to assume more nearly their normal no-load position.

The space 28 is filled with a suitable grease and this will not need to be renewed over long periods of time as only a very small amount of grease can escape and the tight construction prevents dirt and grit from getting into the space.

Annular end plates 29 may be secured over the ends of the semi-spherical ends 21 of the radius rods and may be held in place as by spot welding at intervals as 30 in Fig. 2.

While the spring 26 is shown inside the radius rods 19, it will be understood that under some circumstances it will be desirable to reverse this order, placing the spring 26 outside the radius rods.

While I have described and shown but a single embodiment of the invention, it is to be understood that it is capable of many modifications. Changes, therefore, in the construction and arrangement may be made which do not depart from the spirit and scope of the invention as disclosed in the appended claims.

I claim:

1. In a gear, in combination, a hub adapted to be secured to a shaft and having a flange, a gear member adapted to be journaled on the said shaft for oscillatory movement, radius rods connecting the flange and member, and spring means connecting said flange and member for driving the gear member and for keeping said flange and member pressed outwardly against said radius rods.

2. In a gear, in combination, a hub adapted to be secured to a shaft and having a flange, a gear member adapted to be journaled in axial alignment with said shaft for oscillatory movement, radius rods connecting the flange and member, and spring means connecting said flange and member for driving the gear member and for keeping said flange and member pressed outwardly against said radius rods.

3. In a gear, in combination, a hub adapted to be secured to a shaft and having a flange, a gear member having a bushing adapted to be journaled in axial alignment with said shaft for oscillatory movement, radius rods connecting the flanges and member, and spring means connecting said flange and member for driving the gear member and for keeping said flange and member pressed outwardly against said radius rods.

4. In a gear, in combination, a hub adapted to be secured to a shaft and having a flange, a gear member having a bearing on the outer portion of said flange adapted to be journaled in axial alignment with said shaft for oscillatory movement, radius rods connecting the flanges and member and spring means connecting said flange and member for driving the gear member and for keeping said flange and member pressed outwardly against said radius rods.

5. In a gear, in combination, a hub adapted to be secured to a shaft and having a flange, a gear member adapted to be journaled on the said shaft for oscillatory movement, radius rods connecting the flanges and member, and spring means connecting said flange and member for driving the gear member and for keeping said flange and member pressed outwardly against said radius rods, said hub and gear member being adapted to engage each other as the gear member is turned with respect to the hub.

GEORGE F. ECKART.